United States Patent Office 3,128,448
Patented Apr. 7, 1964

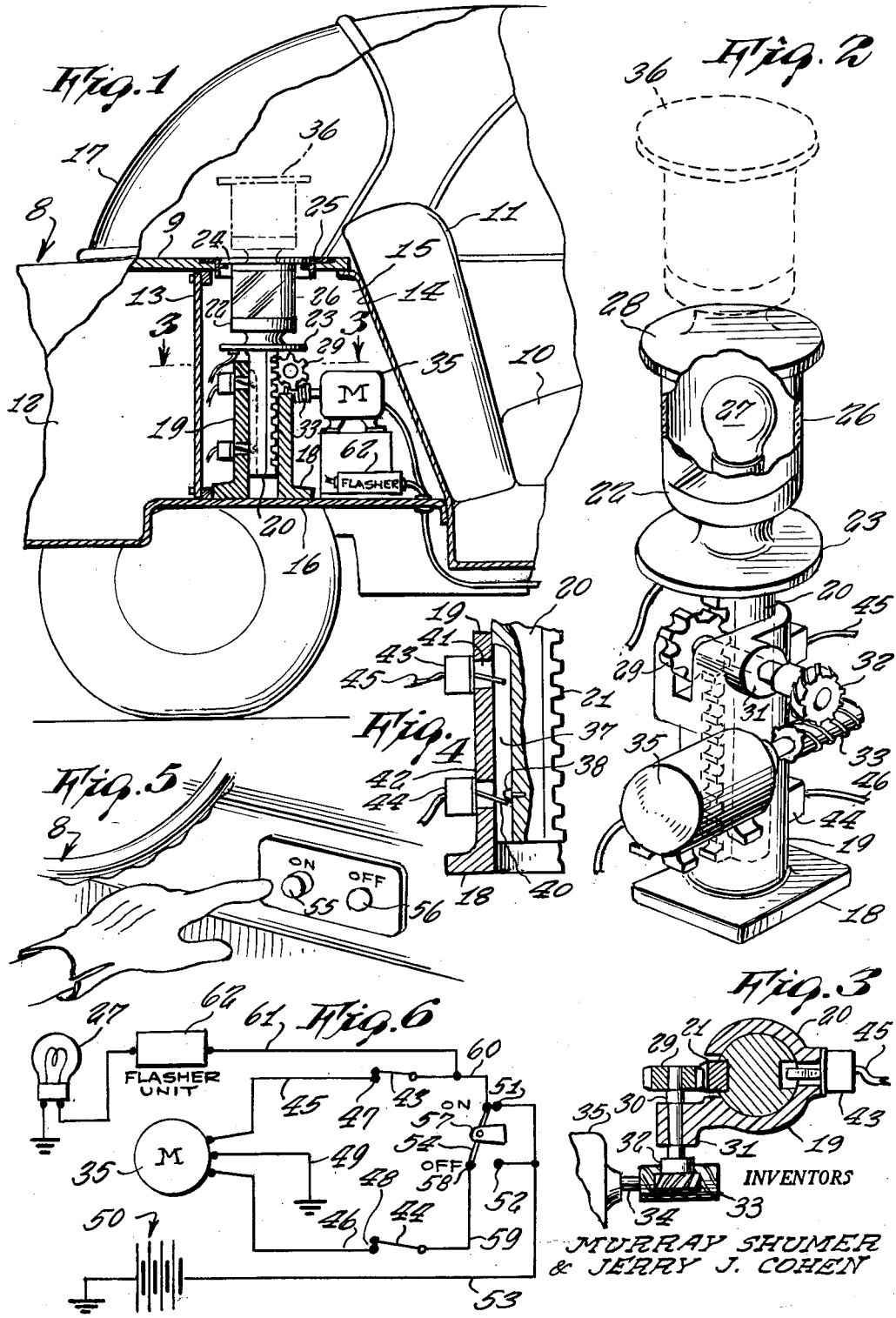

1

3,128,448
REAR WINDOW BLINKER LIGHT
Murray Shumer, 94 Rockaway Parkway, Brooklyn 12, N.Y., and Jerry Cohen, 783 Lydia Place, Westbury, N.Y.
Filed Dec. 23, 1960, Ser. No. 78,185
1 Claim. (Cl. 340—87)

The present invention relates to signal and warning lights for automobiles and the like, and particularly to what we choose to term a rear window blinker light.

The main object of our invention is to provide an automobile with a special blinker or signal light in a protected position at the rear of the vehicle in order to be visible from behind the car involved.

Another object of our invention is to provide an automobile with a rear blinker light which is visible at a higher level than common rear lights in order to prevent the light from being obscured by the hood or other front portions of a car following the automobile carrying the light involved.

A further object of the invention is to have such a rear blinker light which is mechanically operated from a lower inactive position to a raised active and visible position in which it is visible to the outside from within the rear window of the vehicle involved.

Yet another object is to have such a rear blinker light controlled from the dash board of the car by means of switch devices accessible to the driver for raising and lowering the light at will.

It is also an object, withal to have such a blinker light in the rear portion of an automobile which includes a complete operating unit which may take the form of an electrically driven device or a hinged mechanically raised or lowered device, the main principle being the same for both forms.

A practical object is, of course to have such a rear blinker light which as a hole is relatively simple in construction, certain to operate and reasonable in cost in order to encourage wide distribution on the market.

Other objects and advantages of our invention will appear in greater detail as the specification proceeds.

In order to facilitate clear comprehension of this invention for a proper appreciation of the salient features thereof, the invention is illustrated on the accompanying drawing forming part hereof, in which:

FIGURE 1 is a partial vertical section of the rear portion of an automobile with the invention incorporated therein which fulfills the foregoing objects and embodies the novel features outlined;

FIGURE 2 is a perspective view of the blinker light apparatus as a whole disclosing the features and operation thereof;

FIGURE 3 is a transverse section of the same apparatus as taken on line 3—3 in FIGURE 1;

FIGURE 4 is a partial vertical section of the lower portion of the same apparatus disclosing the automatic contact means for limiting raising and lowering movement of the light during operation;

FIGURE 5 is a fragmentary perspective view of the dash board of the car provided with the blinker light and showing the on and off switch buttons for starting and stopping operation of the blinker light;

FIGURE 6 is a circuit diagram for the blinker light apparatus.

Throughout the views, the same reference numerals indicate the same or like parts and features.

Modern cars are often rather long, so that it is desirable to avoid adding any device or light to the rear ends thereof, for this actually endangers the device so added because it becomes so exposed to the hazards of traffic, as to be all too easily damaged. It is also true

2 that if a light were mounted upon the rear of a car in addition to the normal equipment thereof, it would usually be located too low to be of maximum service as it would often be obscured by portions of the car following that upon which the light is thus mounted.

Upon considering this problem, and likewise taking advantage of available space within the rear windows of cars commonly having a rear ledge above the back of the rear seat, it is now proposed to introduce signal means into the mentioned space in a novel and useful form which has several inherent advantages as mentioned, which will now be set forth in the following, due reference being had to the drawing already referred to above.

Hence, in the practice of our invention, an automobile, generally indicated at 8 has a ledge 9 behind and above the rear seat 10 rearwardly of the back 11 thereof and forming part of the top of the luggage trunk 12. Between the vertical front wall 13 of this trunk and the rearwardly inclined rear wall 14 of seat back 11 is a chamber 15, extending from the floor 16 to ledge 9, above which is the inclined rear window 17. This describes the locale of the invention, now to be detailed.

Upon the floor 16 of chamber 15 is mounted the base flange 18 of an upright hollow support 19 in which is vertically slidable plunger 20 having a rack 21 fixed thereto and surmounted by a lamp housing 22 above a flange 23 adapted in raised position of this lamp housing to close the opening 24 in a collar 25 secured upon ledge 9. The lamp housing has a transparent or translucent window 26 surrounding a lamp 27 and in turn surmounted by a second flange 28 which is similar to flange 23 and adapted to close the same opening in collar 25 in lowered position of the lamp housing as shown in FIGURE 1. A pinion 29 mounted on a shaft 30 supported by bearing 31 meshes with rack 21, and the shaft also has a helical gear 32 upon the other end meshing with a helical drive pinion 33 fixed on drive shaft 34 of a motor 35 which is thus adapted to rotate pinion 29 and raise or lower rack 21 and with it plunger 20 and lamp housing 22 from a low position shown in both FIGURES 1 and 2, to a raised position indicated in broken lines at 36. When the lamp housing is withdrawn downwardly, its flanged top 28 is substantially flush with rear window ledge 9, but when elevated to its upper position as indicated, the lamp is fully visible rearwardly through window 17 to all drivers following the car 8, of which more later.

In the rear of plunger 20 is a deep groove or slot 37 in the lower portion of which is a detent 38 adapted to be brought into contact with either one of a pair of switch levers or fingers 39 and 40 projecting into the slot through apertures 41 and 42 in support 19 from switches 43, 44, mounted on the support exteriorly. These switches are individually connected to a pair of branch circuits 45, 46 through contacts 47, 48, which circuits are directly connected to reversible motor 35, while a return line 49 from this motor connects with ground, a source of current 50 being also connected to ground in one direction and to a pair of contacts 51, 52 through a conductor 53. A rocker switch arm 54 operated by a pair of selector buttons 55, 56 (FIGURE 5) is pivotally mounted on a pivot mounting 57 and adapted alternately to make effective contact with a pair of contacts 51, 52 already mentioned, on conductor 53, while a further contact 58 on a line 59 is alternative with contact 52 and connected to switch 44. Switch 43 is connected by line 60 to contact 51 and by conductor 61 to a flasher 62 which in turn connects with lamp 27, and this lamp connects with ground in parallel with motor 35.

The arrangement is such that when button 55 is pushed so that arm 54 is in the position shown in FIGURE 6, motor 35 will drive the pinion 29 through gears 32, 33 so that rack 21 and plunger 20 are raised to display the lamp 27 in housing 22 above ledge 9 through window 17, but as the plunger rises, detent 38 strikes upper switch arm 39 of switch 43 and opens the latter, opening the motor circuit, so that the lamp remains in elevated position, the flasher 62 causing the lamp to glow intermittently. When the button 56 is pressed, arm 54 connects with contact 52 and energizes the motor in the opposite direction, lowering the plunger and lamp housing below the ledge 9, while detent makes contact with the lower switch finger 40, opening the circuit along line 46, stopping the motor, with the lamp housing in its lowered position of FIGURE 1.

Manifestly, variations may be resorted to, and parts and features may be modified or used without others within the scope of the appended claim.

Having now fully described our invention, we claim:

A rear window blinker light, for an automobile having a ledge at the rear window thereof rearwardly of the back of a seat, including a lamp housing with an electric lamp therein, the ledge having an opening therein, and means for vertical movement of said lamp housing through said opening from an upper display position above said ledge to a concealed position below the ledge and vice versa, without rotational movement of said lamp housing during said vertical movement, said lamp housing having an upright supporting plunger surmounted by the housing, and the vehicle having a stationary hollow support for the plunger, means for raising and lowering said plunger while guided by said hollow support, said means comprising a rack upon said plunger, a rotatable pinion meshing with said rack and having a driven shaft rotatably supported upon the stationary hollow support, said shaft having a driven pinion engaging a driving pinion mounted on a motor shaft of a reversible electric motor, two branch electrical circuits connected to said motor and a current source, as well as a flasher unit connected to the lamp housing and its lamp and to the current source, selective switch means alternatively connectible to the two branch circuits, a pair of switches with switch fingers vertically spaced apart on said stationary hollow support, said switch fingers being in the vertical path of a detent on said plunger, said detent being movable between said fingers, the detent engaging of one said fingers at each end of its path of travel to activate selectively said switches, one of which switches is in each one of said branch circuits, said selective switch means including a rocker arm switch with a pair of manual push buttons located on the dashboard of a vehicle and capable of operating said rocker arm switch at will, said lamp housing having a circular upper flanged top and a circular base flange of substantially equal diameter alternatively adapted to close the opening in the ledge, said stationary hollow support with the plunger and lamp housing together with motor flasher unit form an operating unit based below the ledge and supported on a portion of the vehicle below said ledge, said pinions upon said driven shaft differing from one another by one being a gear pinion meshing directly with the rack upon the plunger and the other being a helical pinion, while the pinion on the motor shaft forming the driving pinion is a helical pinion meshing with the helical pinion upon the driven shaft.

References Cited in the file of this patent
UNITED STATES PATENTS

| | | |
|---|---|---|
| 2,473,187 | Zelk | June 14, 1949 |
| 2,738,492 | Arneson et al. | Mar. 13, 1956 |
| 2,843,836 | McDonald | July 15, 1958 |
| 2,939,108 | McIntire | May 31, 1960 |